Patented Oct. 10, 1939

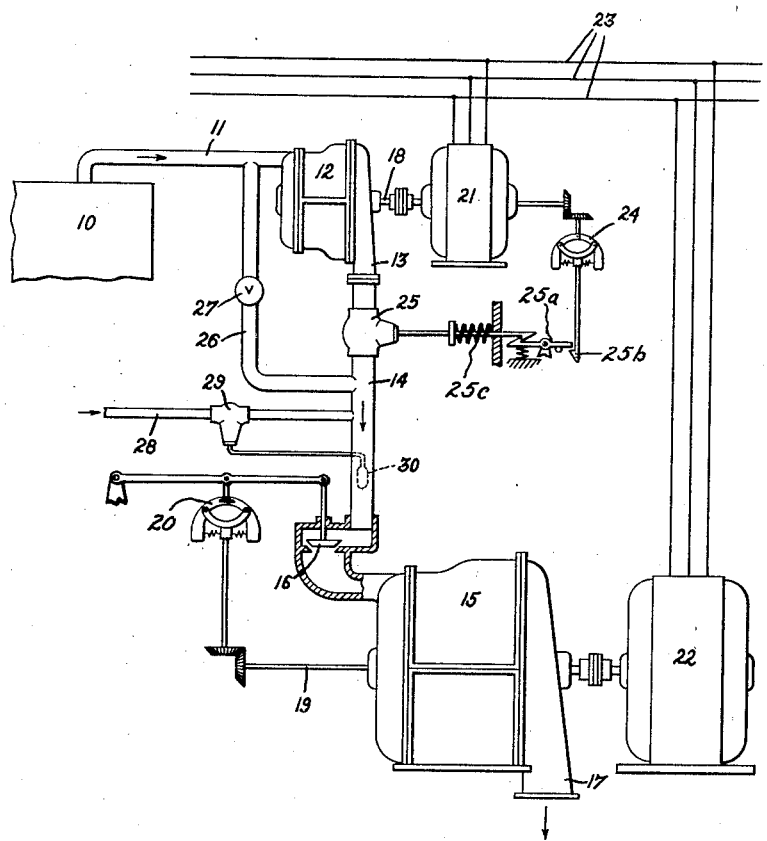

2,175,884

UNITED STATES PATENT OFFICE 2,175,884

HIGH PRESSURE, HIGH TEMPERATURE TURBINE PLANT

John H. Doran, Scotia, N. Y., assignor to General Electric Company, a corporation of New York Application January 22, 1938, Serial No. 186,388

2 Claims. (Cl. 60—70)

The present invention relates to high pressure, high temperature turbine plants in which elastic fluid such as steam produced in an elastic fluid generator is conducted to high pressure turbines or turbine parts at pressures of the order of 1500 lbs. and temperatures of the order of 1200° F. and more. It is clear that the turbines or turbine parts subjected to such high pressures and temperatures suffer considerable wear due to creeping, causing distortion of the turbine elements and shortening considerably their life. These parts accordingly have to be replaced after a certain period of operation at considerable cost. This is true particularly with regard to the valve mechanisms connected ahead of the inlet of the high pressure turbine and usually including both control valves and emergency valves. The control valves for such high pressure and high temperatures are comparatively very large with respect to the size of the turbine itself and difficult to maintain in good operating condition because the parts of these valves must fit close together and still work freely. The necessity frequently to replace these valves renders the operation of such high pressure, high temperature turbines particularly costly.

The object of my invention is to provide improved high pressure, high temperature turbine arrangements whereby the aforementioned drawbacks are substantially overcome. This is accomplished in accordance with my invention by an arrangement in which the high pressure turbine or turbine part is connected directly to the elastic fluid generator, preferably by a short conduit and controlled by valve mechanisms arranged at a lower stage, for instance in the cross-over conduit between the high pressure turbine or turbine part and low pressure turbine or like low pressure elastic fluid consumer. In other words, the conduit connecting the inlet of the high pressure turbine to the elastic fluid generator in accordance with my invention is free from any valve mechanisms whereby the high pressure turbine may be reduced to its simplest form, including a rotor and casing, preferably symmetrical in its shape, and the necessary sealing devices. Such simple high pressure turbine may be replaced after a certain period of operation at comparatively low cost.

For a better understanding of what I believe to be novel and my invention, attention is directed to the following description and the claims appended thereto in connection with the accompanying drawing.

The single figure of the drawing represents diagrammatically an elastic fluid turbine plant embodying my invention.

The arrangement comprises an elastic fluid generator or boiler 10 for producing high temperature, high pressure elastic fluid. The fluid is conducted from the boiler by a conduit 11 to the inlet of a high pressure turbine or turbine part 12 which has an exhaust end 13 connected by a conduit 14 to a low pressure turbine 15 having an inlet valve 16 controlling the flow of elastic fluid thereto and an exhaust end 17. The temperature in the conduit 11 may be of the order of 1200° F. and the temperature in the conduit 14 may be of the order of 900° F. Likewise the pressure in the conduit 11 may be of the order of 1500 lbs. or more and that in the conduit 14 may be of the order of 1200 lbs. Thus, the term "low" pressure and temperature with reference to the turbine 15 is merely to bring out the fact that the temperatures and pressures of the fluid in the inlet of the turbine 15 are lower than the corresponding pressures and temperatures in the inlet of the turbine 12. As pointed out above, the flow of fluid to the turbine 15 is controlled by the inlet valve 16. This valve in accordance with my invention also constitutes a means for controlling the flow of elastic fluid to the turbine 12, in fact it is the sole means for controlling the flow of fluid to the high pressure turbine, the conduit 11 being free from any valve means. Thus, the flow of elastic fluid to the high pressure turbine or turbine parts is controlled by a valve connected into the exhaust or discharge conduit of such high pressure turbine. In the present arrangement the turbine 12 has a shaft 18 and the turbine 15 has a separate shaft 19. The valve 16 is controlled by a speed governor 20 driven from the turbine shaft 19. Both turbines 12, 15 drive electric generators 21 and 22 respectively which are electrically connected to a power line 23. In order to prevent speeding of the high pressure turbine 12, I provide an emergency governing mechanism diagrammatically indicated in the form of a speed-responsive device 24 driven from the turbine shaft 18 and cooperatively connected to an emergency valve 25 in the conduit 14 to shut this valve in case the speed of the turbine 12 with the generator 21 exceeds a predetermined value. The connection between the emergency governor 24 and the emergency valve 25 includes a latch 25a in cooperative relation with a trip member 25b secured to the emergency governor 24. If the speed of the turbine rises above a certain value the trip member 25b engages the latch 25a and thereby permits closing of the emergency valve 25 by the action of a compression spring 25c. Closing of the valve 25 causes the turbine 12 to fill completely with high pressure elastic fluid which acts as a brake due to the friction with the rotor and thereby reduces the speed of the turbine.

In case the valve 25 is shut due to speeding of the turbine 12 or whenever it is desirable to take the turbine 12 out of operation, elastic fluid may be conducted from the elastic fluid generator 10 to the low pressure turbine 15 by means of a conduit 26 including a valve 27 connected between the conduits 11 and 14 and thus forming a bypass for the turbine 12. In order to reduce the high temperature of the elastic fluid conducted through the conduits 26 and 14 to the inlet of the turbine 15, I provide auxiliary means for conducting low temperature fluid to the conduit 14. This means is indicated in the present instance as comprising a conduit 28 for conducting water to the conduit 14. The conduit 28 includes a valve 29 controlled by a temperature-responsive device 30 in the conduit 14 at a point beyond the connections of the conduit 14 with the conduits 26 and 28 as regards the direction of flow in the conduit 14. The emergency valve 25 necessarily is connected ahead of the connection between conduits 26 and 14 and preferably as close to the high pressure turbine 12 as possible in order to insure a quick speed drop of the high pressure turbine 12 upon operation of the emergency governor 24.

The high pressure conduit 11 is preferably made as short as possible in order to reduce heat losses. From another viewpoint, the high pressure turbine 12 should be arranged in close proximity to the elastic fluid generator 10.

During normal operation the flow of elastic fluid to the turbine 12 is controlled by the demand for elastic fluid from the low pressure turbine 15. A rise in speed of the turbine 15 causes, through the speed governor 20, closing of the valve 16 which thereby reduces the flow of elastic fluid to the turbine 15 and also the flow of high pressure elastic fluid to the high pressure turbine 12. The speed of the turbine 12 is determined by the speed of the turbine 15 because the generators 22, 21 driven by these turbines are electrically connected to the same line 23. The emergency governing mechanism for the turbine 12 in the present arrangement should operate only in case the excitation for the generator is lost on either turbo-generator set or if the electrical connection for either generator to the power line is interrupted. From another viewpoint, my invention comprises a turbine arrangement with high pressure, high temperature stages 12 and low pressure, low temperature stages 15 in which the flow of elastic fluid to the high pressure, high temperature stages 12 is controlled solely by valve means 16 disposed intermediate the high pressure and low pressure stages.

What I claim as new and desire to secure by Letters Patent of the United States is:

1. A high pressure, high temperature turbine plant including the combination of an elastic fluid generator, a high pressure turbine directly connected to the generator, a low pressure turbine, a conduit for conducting fluid discharged from the high pressure turbine to the low pressure turbine, valve means in the inlet of the low pressure turbine for controlling the flow of elastic fluid to the both turbines, a bypass for the high pressure turbine, and means for conducting low temperature fluid to the conduit in case the high pressure turbine is put out of operation.

2. A high pressure, high temperature turbine plant including the combination of an elastic fluid generator, a high pressure turbine having an inlet conduit free from any valve means and directly connected to the generator, a low pressure turbine, a cross-over conduit between the turbines to conduit fluid exhausted from the high pressure turbine to the low pressure turbine, the turbines having separate shafts, means including a valve in the inlet of the low pressure turbine and a governing mechanism driven from the low pressure turbine shaft for controlling the flow of elastic fluid to the low pressure turbine as well as to the high pressure turbine, an emergency valve in the cross-over conduit, an emergency governor operated from the high pressure turbine shaft to shut the emergency valve when the high pressure turbine speed reaches a certain value, a bypass conduit including a valve for bypassing elastic fluid with respect to the high pressure turbine to conduct such fluid from the generator to the cross-over conduit when the high pressure turbine is out of operation, and means for conducting low temperature fluid to the cross-over conduit comprising a conduit including a valve and connected to the cross-over conduit and a temperature-responsive device to controlling the last-named valve in response to temperature changes in the cross-over conduit.

JOHN H. DORAN.